United States Patent
Stoddard et al.

(10) Patent No.: US 10,071,625 B1
(45) Date of Patent: Sep. 11, 2018

(54) FLOW CONTROL ASSEMBLY AND METHOD UTILIZING APERTURED SHUTTERS

(71) Applicant: Ford Global Technologies, LLC, Dearborn, MI (US)

(72) Inventors: Eric Stoddard, Birmingham, MI (US); Mark Taylor, Royal Oak, MI (US); Aditya Narayan, Detroit, MI (US); Giancarlo Foschetti, Dearborn, MI (US); Jason Castriota, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/677,545

(22) Filed: Aug. 15, 2017

(51) Int. Cl.
*B60K 11/08* (2006.01)
(52) U.S. Cl.
CPC .................... *B60K 11/085* (2013.01)
(58) Field of Classification Search
CPC ..................................................... B60K 11/085
See application file for complete search history.

(56) References Cited

U.S. PATENT DOCUMENTS

| | | | |
|---|---|---|---|
| 6,854,544 B2 * | 2/2005 | Vide | B60K 11/085 180/68.1 |
| 8,550,887 B2 | 10/2013 | Walters | |
| 8,814,638 B2 | 8/2014 | Hasegawa et al. | |
| 8,931,828 B2 | 1/2015 | Townson et al. | |
| 9,233,605 B2 | 1/2016 | Hijikata | |
| 9,333,850 B2 * | 5/2016 | Ruppert | B60R 19/52 |
| 2011/0297468 A1 * | 12/2011 | Coel | B60K 11/085 180/68.1 |
| 2013/0068403 A1 * | 3/2013 | Fenchak | B60K 11/085 160/218 |
| 2013/0223980 A1 | 8/2013 | Pastrick et al. | |
| 2014/0090610 A1 * | 4/2014 | Higuchi | B60K 11/085 123/41.58 |
| 2014/0273806 A1 | 9/2014 | Frayer, III | |
| 2014/0290599 A1 | 10/2014 | Numata et al. | |
| 2014/0370795 A1 * | 12/2014 | Klop | B60H 1/242 454/75 |
| 2015/0183313 A1 * | 7/2015 | Bruckner | B60K 11/085 180/68.1 |
| 2017/0203649 A1 * | 7/2017 | Jakobs | B60K 11/085 |

\* cited by examiner

*Primary Examiner* — Brian L Swenson
(74) *Attorney, Agent, or Firm* — Carlson, Gaskey & Olds, P.C.

(57) ABSTRACT

An exemplary flow control assembly includes, among other things, shutters each having at least one aperture. The shutters are configured to move back and forth between a first position and a second position to influence a flow through the at least one aperture. A flow control method includes, among other things, moving a shutters back and forth between a first position and a second position. The first position permits more flow through at least one aperture within each of the shutters than the second position.

20 Claims, 9 Drawing Sheets

FLOW CONTROL ASSEMBLY AND METHOD UTILIZING APERTURED SHUTTERS

TECHNICAL FIELD

This disclosure relates generally to controlling flow and, more particularly, to a flow control assembly and method that utilize apertured shutters to control flow.

BACKGROUND

Shutters can be used to regulate flow to various areas of a vehicle, such as radiators, condensers, and other systems. The shutters are actuated to regulate flow through an opening, such as a grille opening to an engine compartment. In some vehicles, shutters are actuated to alter aerodynamic drag on the vehicle.

Typically, the shutters move between a closed position where the shutters interface with each other to substantially block all flow, and an open position where flow moves between adjacent shutters. The shutters contribute to the aesthetics of the vehicle.

SUMMARY

A flow control assembly according to an exemplary aspect of the present disclosure includes, among other things, shutters each having at least one aperture. The shutters are configured to move back and forth between a first position and a second position to influence a flow through the at least one aperture.

In a further non-limiting embodiment of the foregoing assembly, the shutters in the first position permit more flow through the apertures than the shutters in the second position.

In a further non-limiting embodiment of any of the foregoing assemblies, each of the apertures has an outer perimeter that is provided entirely by one of the shutters.

In a further non-limiting embodiment of any of the foregoing assemblies, each of the apertures has one of the shutters about an entire circumference.

In a further non-limiting embodiment of any of the foregoing assemblies, the shutters in the second position block flow through the at least one aperture.

In a further non-limiting embodiment of any of the foregoing assemblies, the shutters in the first position permit flow through the at least one aperture from a position outside a vehicle to a position within a compartment of the vehicle.

In a further non-limiting embodiment of any of the foregoing assemblies, the compartment is an engine compartment.

In a further non-limiting embodiment of any of the foregoing assemblies, each aperture extends along a respective aperture axis. The aperture axes are more aligned with a longitudinal axis of the vehicle when the shutters are in the first position than when the shutters are in the second position.

In a further non-limiting embodiment of any of the foregoing assemblies, the aperture axes are aligned with the longitudinal axis of the vehicle when the shutters are in the first position, and the apertures axes are aligned with a cross-car axis of the vehicle when the shutters are in the second position.

In a further non-limiting embodiment of any of the foregoing assemblies, the at least one aperture comprises a first aperture and a second aperture that is vertically misaligned relative to the first aperture.

A further non-limiting embodiment of any of the foregoing assemblies includes a structure of a vehicle. The shutters are configured to move back and forth between the first position and the second position to alter flow through an opening within the structure. The shutters in the second position block flow through the apertures to block flow through the opening.

In a further non-limiting embodiment of any of the foregoing assemblies, each of the at least one apertures is completely open.

A flow control method according to an exemplary aspect of the present disclosure includes, among other things, moving shutters back and forth between a first position and a second position. The first position permits more flow through at least one aperture within each of the shutters than the second position.

In a further non-limiting embodiment of the foregoing method, an entire circumferential perimeter of each of the apertures is provided by one of the shutters.

A further non-limiting embodiment of any of the foregoing methods includes communicating the flow directly from the at least one aperture to a compartment of a vehicle.

A further non-limiting embodiment of any of the foregoing methods includes moving the plurality of shutters to control flow through an opening of a structure of a vehicle. The shutters in the second position block flow through the apertures to block flow through the opening.

In a further non-limiting embodiment of any of the foregoing methods, the moving comprises rotating the shutters.

In a further non-limiting embodiment of any of the foregoing methods, each aperture extends along a respective aperture axis. The aperture axes are rotated away from a position aligned with a longitudinal axis of a vehicle when the plurality of shutters are rotated from the first position to the second position.

In a further non-limiting embodiment of any of the foregoing methods, each aperture is completely open.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to controlling flow through an opening utilizing shutters having shutter apertures. The opening can be an opening of a vehicle, such as a grille opening that permits flow from outside the vehicle to an engine compartment of the vehicle. In such an example, the shutters are moved to control flow to the engine compartment.

The shutters can move to positions where flow can move through the opening by moving through the shutter apertures. The shutters are movable between positions that permit more flow through the shutter apertures and positions that permit less flow through the shutter apertures.

The shutters can move to alter an appearance of the opening as well as to control flow through the opening.

Figure 1:
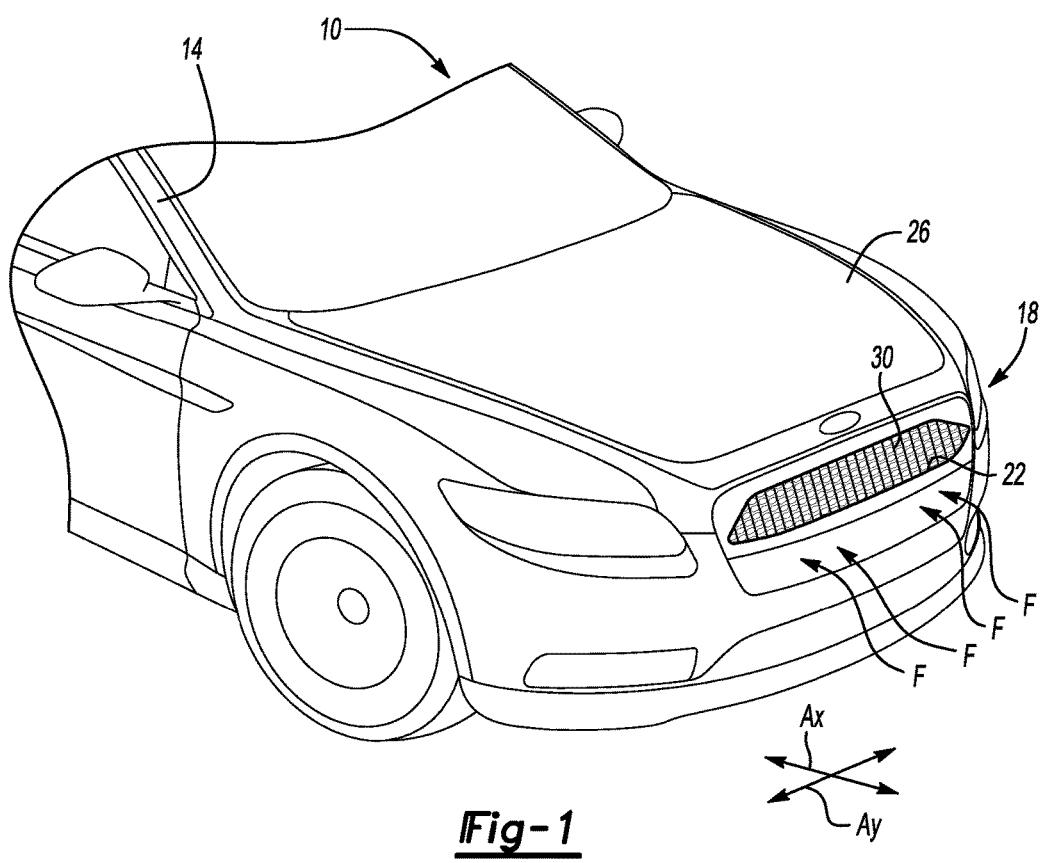
FIG. 1 illustrates a front of a vehicle incorporating a flow control assembly according to an exemplary embodiment of the present disclosure.

Referring to FIG. 1, a front 10 of a vehicle 14 includes a flow control assembly 18 disposed within a grille opening 22 to an engine compartment 26 of the vehicle 14. The flow control assembly 18 is utilized to control movement of a flow F of air from outside the vehicle 14, through the opening 22, to the engine compartment 26.

Although disclosed in connection with the vehicle 14 and the engine compartment 26, the flow control assembly 18 could be utilized to control flow through an opening in another areas of the vehicle 14, such as an opening within a passenger cabin of the vehicle 14, or to control flow in assemblies other than a vehicle.

Referring now to FIGS. 2 to 8 with continuing reference to FIG. 1, the flow control assembly 18, in this exemplary non-limiting embodiment, includes a plurality of shutters 30 each having at least one shutter aperture 34. The flow control assembly 18 further includes an actuator assembly 38.

In this example, each of the shutters 30 in the flow control assembly 18 includes at least one shutter aperture 34. In other examples, some of the shutters 30 include at least one shutter aperture 34, and other shutters remain unapertured.

The example flow control assembly 18 includes fourteen individual shutters 30, but other numbers could be used in other examples. The shutters 30 have a plan view sweep that matches a desired contour for the grille area of the vehicle 14.

The flow permitted by the flow control assembly 18 to the engine compartment 26 depends, among other things, on the position of the shutters 30. The actuator assembly 38 is used to move the shutters 30 of the flow control assembly 18 back and forth between the fully open position of FIGS. 2 and 3, and the fully closed position of FIGS. 4 and 5. The actuator 38 can additionally position the shutters at partially open positions, such as the partially open position of FIGS. 6 and 7. The various positions can provide design variability. This is because, among other things, the flow control assembly 18 with shutters 30 closed has a different visual geometries than the flow control assembly 18 with the shutters 30 open, or partially open.

In some examples, areas of the shutters 30 could be painted in different colors so that the visible areas of the shutters 30 in the fully closed position are textured or colored differently than the visible areas of the shutters 30 in the fully open position. This could provide even greater design flexibility and desirable aesthetics to the flow control assembly 18.

In this exemplary embodiment, the actuator assembly 38 includes a passenger side actuator 38p and a driver side actuator 38d. The passenger side actuator 38p moves shutters 30 on a passenger side of the flow control assembly 18, and the driver side actuator 38d moves shutters 30 on the driver side of the flow control assembly 18. The passenger side actuator 38p and the driver side actuator 38d are positioned, in this example, at the outboard sides of the flow control assembly 18. In another example, the actuator assembly 38 comprises one or more individual actuators located near a median of the flow control assembly 18 instead of, or in addition to, individual actuators at the outboard sides of the flow control assembly.

In this example, the passenger side actuator 38p is coupled to seven shutters 30 on the passenger side of the flow control assembly 18 through respective linkages 42, and the driver side actuator 38d is coupled to seven shutters 30 on the driver side of the flow control assembly 18 through respective linkages 42. The shutters 30 rotate relative to the opening 22 when the actuator assembly 38 moves the respective linkages 42.

The shutters 30 each include a first pivot pin 46 and a second pivot pin 50. In this exemplary embodiment, the first pivot pin 46 is at an upper vertical end of each of the shutters 30, and the second pivot pin 50 is at a lower vertical end of the each of the shutters 30.

To move the shutters 30, the passenger side actuator 38p and driver side actuator 38d can each move respective linkages 42 to rotate the shutters 30 about the first pivot pin 46 and the second pivot pin 50. The second pivot pins 50 are each received within a pivot aperture (not shown) provided within the portion of the vehicle 14 providing the opening 22. The pivot aperture permits rotational movement of the shutters 30 relative to the other portions of the vehicle 14 while keeping the respective second pivot pin 50 secured.

In this example, the shutters 30 each rotate about a substantially vertically oriented axis. In other examples, the shutters 30 could be configured to rotate about axes having different orientations, such as horizontal. Vertical and horizontal, for purposes of this disclosure, are with reference to ground and a normal orientation of the vehicle 14 when driving or parked.

The actuator assembly 38 rotates the shutters 30 in response to a command from a flow control module 54.

The actuator assembly 38 could be commanded to rotate the shutters 30 in response to a command from a user, or automatically in response to a vehicle condition. For example, if a speed of the vehicle 14 exceeds a threshold speed, the flow control module 54 may command the actuator assembly 38 to move the linkages 42 to rotate the shutters 30 to move to the fully closed position of FIGS. 4 and 5. This positioning of the shutters 30 blocks the flow F through the opening 22, which can enhance fuel economy by reducing aerodynamic drag on the vehicle 14. In this example, the shutters 30 rotated 90 degrees when moving from the fully closed position to the fully open position.

The flow control module 54 commanding the actuator assembly 38 can be equipped with executable instructions for interfacing with and commanding operation of the actuator assembly 38 of the flow control assembly 18. The flow control module 54 can include a processing unit and non-transitory memory for executing the various control strategies and modes of the flow control assembly 18. The processing unit, in an embodiment, is configured to execute one or more programs stored in the memory of the flow control module 54. It should be understood that the flow control module 54 could be part of an overall vehicle control module, such as a vehicle system controller (VSC), or could alternatively be a stand-alone controller separate from the VSC.

Figure 2:
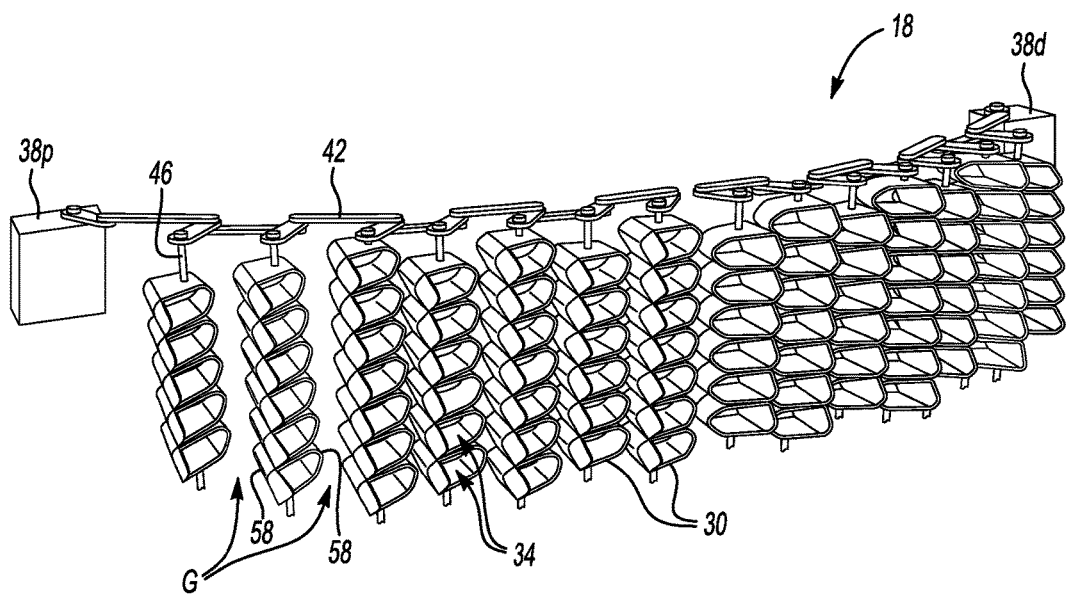
FIG. 2 illustrates a perspective view of the flow control assembly of FIG. 1 having a plurality of shutters in a fully open position.
Figure 3:
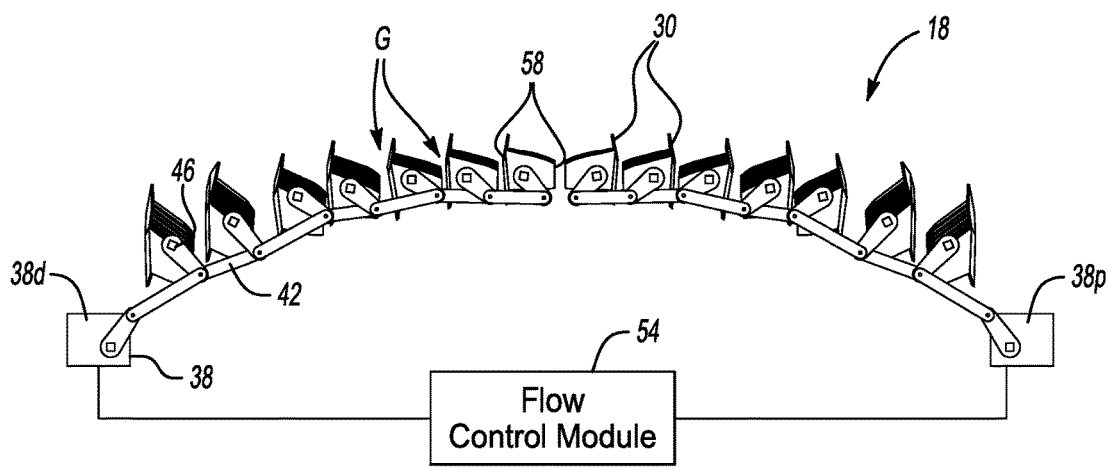
FIG. 3 illustrates a top view of the flow control assembly in the position of FIG. 2.
Figure 4:
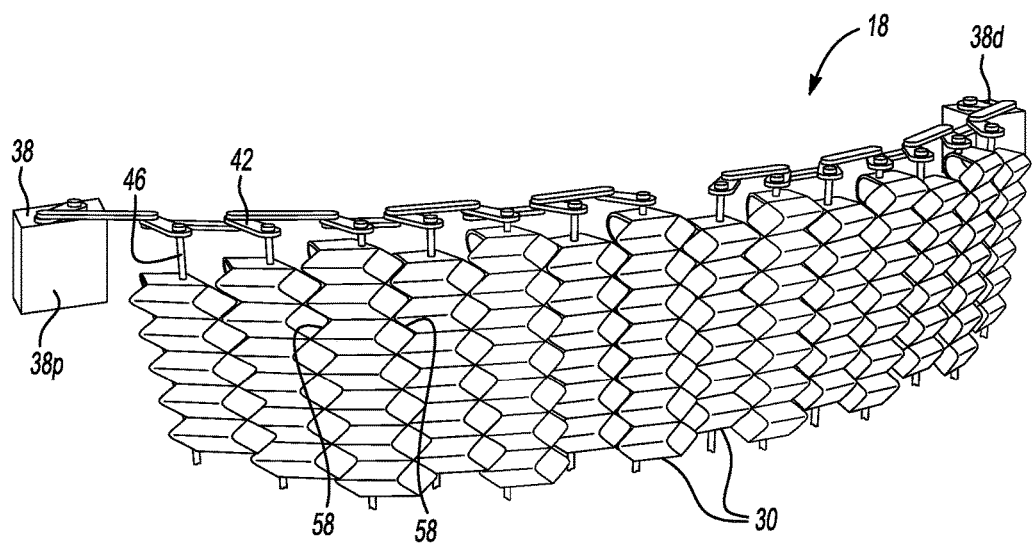
FIG. 4 illustrates a perspective view of the flow control assembly of FIG. 1 having the plurality of shutters in a fully closed position.
Figure 5:
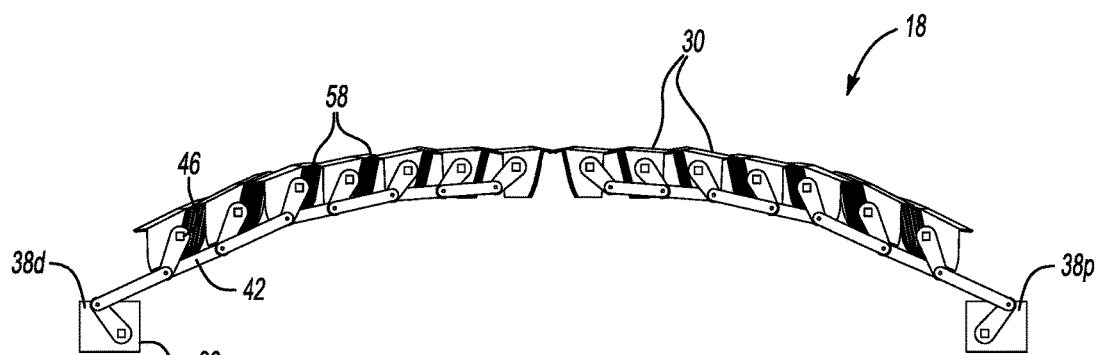
FIG. 5 illustrates a top view of the flow control assembly in the position of FIG. 4.

When moving the shutters 30 from the fully open position of FIGS. 2 and 3 to the fully closed position of FIGS. 4 and 5, the actuator assembly 38 on the passenger side rotates the respective shutters 30 in a counterclockwise direction when viewed from the end of the shutters 30 having the first pivot pin 46. When moving the shutters 30 from the fully open position of FIGS. 2 and 3 to the fully closed position of FIGS. 4 and 5, the actuator assembly 38 on the passenger side rotates the respective shutters 30 in a clockwise direction when viewed from the end of the shutters 30 having the first pivot pin 46.

In some examples, the flow control module 54 can control the actuator assembly 38p separately from the actuator assembly 38d. In such examples, the shutters 30 on the passenger side of the vehicle 14 could be in an open position, while the shutters 30 on the driver side are in a closed position, or vice versa.

Opening the shutters 30 on the passenger side while closing the shutters 30 on the driver side could be desirable if directing flow F into the passenger side of the engine compartment 26 is desired, but not flow F into the driver side. For example, the passenger side may require more cooling than the driver side or an air intake for an engine may be located on the passenger side. Opening the shutters 30 on the driver side while closing the shutters 30 on the passenger side could also be desired in some situations, if, for example, the air intake to the engine were instead located on the driver side.

The independent control of the shutters 30 could also be desired to provide the flow control assembly 18 with a particular aesthetic characteristic. Half open, half closed, for example.

When all the shutters 30 are in the closed position of FIGS. 4 and 5, the shutters 30 substantially block all flow through the opening 22. In the closed position, the shutters 30 are rotated such that each opposing lateral edges 58 of the shutters 30 is directly adjacent a lateral edge 58 of an adjacent shutter 30, or a portion of the vehicle 14 providing the opening 22. This positioning of the shutters 30 blocks flow from moving through gaps G (see FIGS. 2 and 3) between the shutters 30 to the engine compartment 26, and additionally blocks flow from moving through the shutter apertures 34 to the engine compartment 26.

Figure 6:
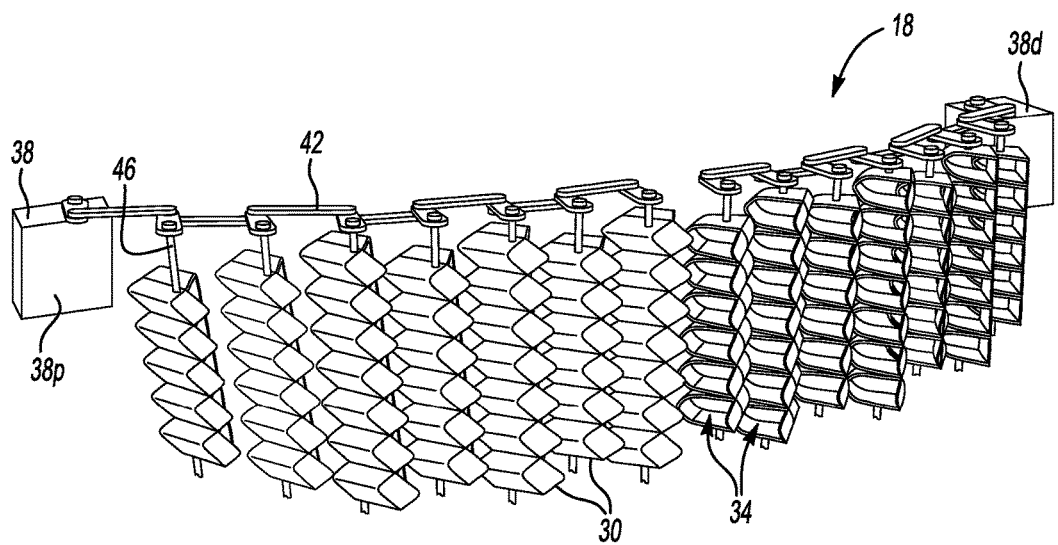
FIG. 6 illustrates a perspective view of the flow control assembly of FIG. 1 having the plurality of shutters in a partially open position.
Figure 7:
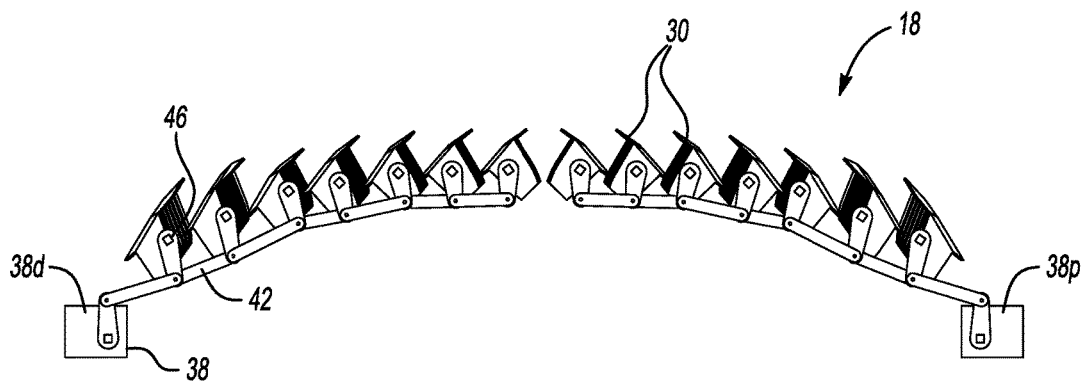
FIG. 7 illustrates a top view of the flow control assembly in the position of FIG. 6.

When the actuator assembly 38 moves the shutters 30 to the fully open position of FIGS. 2 and 3, or the partially open position of FIGS. 6 and 7, some of the flow F can move through the shutter apertures 34 to the engine compartment 26. When the actuator assembly 38 moves the shutters 30 to the fully open position of FIGS. 2 and 3, or the partially open position of FIGS. 6 and 7, some of the flow can additionally move through the gaps G between the shutters 30.

Figure 8:
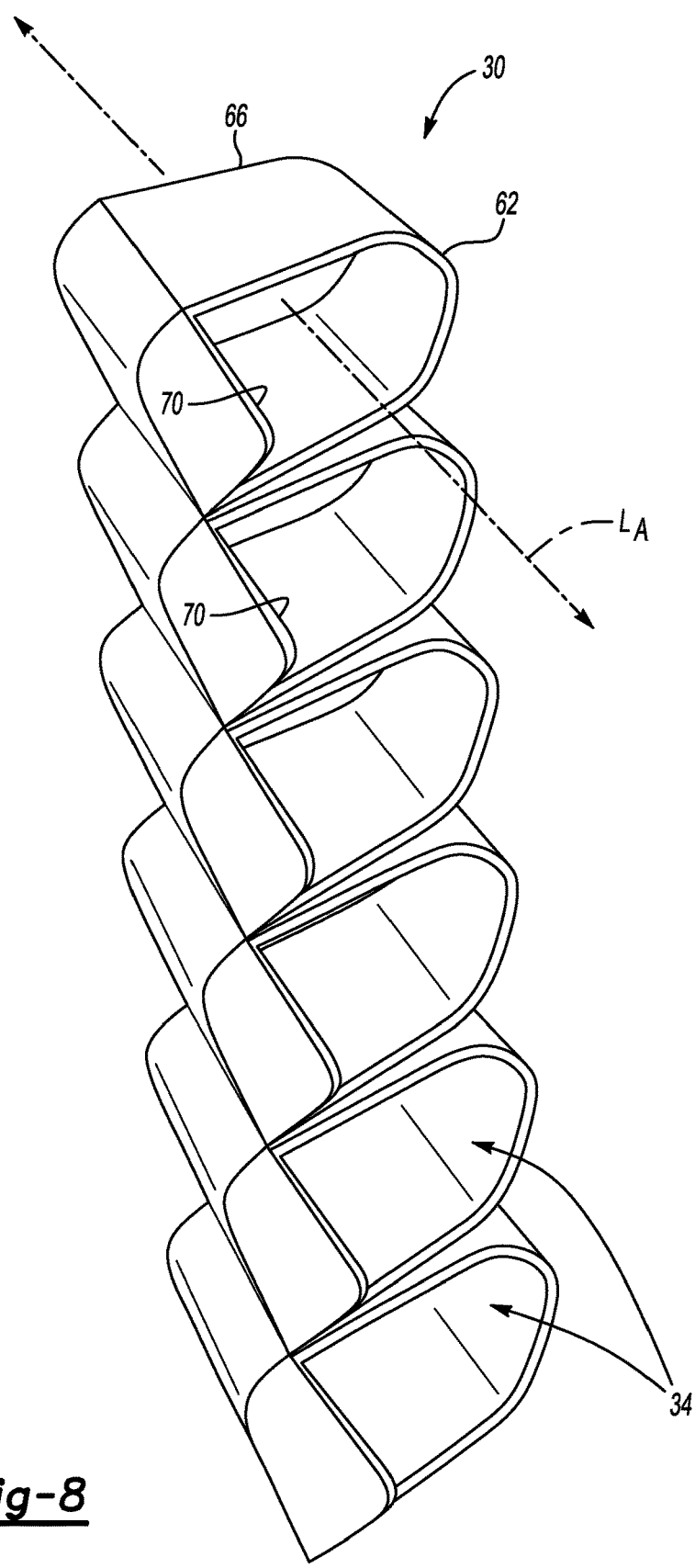
FIG. 8 illustrates a perspective view of one of the shutters from the flow control assembly of FIG. 1.

Referring now to FIG. 8, with continuing reference to FIGS. 1-7, each of the shutter apertures 34 within the shutters 30 extends along a respective longitudinal axis $A_A$ from an inlet 62 to an outlet 66. Notably, an outer perimeter of the shutter apertures 34 is each provided entirely by one of the shutters 30. That is, the shutter 30 extends about an entire circumference of the shutter aperture 34.

The repositioning of the shutters 30 by the actuator assembly 38 moves the inlets 62 of the shutters 30 to an exposed position where the inlets 62 can receive flow from outside the vehicle 14. As the vehicle 14 is driven forward, the flow F can move through the inlets 62, into the respective shutter apertures 34, and through the outlets 66 to the engine compartment 26. The shutter aperture 34 effectively directs the flow into the engine compartment 26.

As to the repositioning, the vehicle 14 generally has a longitudinal axis $A_X$ and a cross-car axis $A_Y$ (see FIG. 1). When the shutters 30 are in the closed position of FIGS. 4 and 5, the longitudinal axes $A_A$ of the shutter apertures 34 are substantially aligned with the cross-car axis $A_Y$.

Repositioning the shutter apertures 34 to a position where the inlets 62 can receive flow involves rotating the shutters 30 such that the longitudinal axes $A_A$ of the shutter apertures 34 are more aligned with the longitudinal axis $A_Y$ of the vehicle 14.

In the fully open position of FIGS. 2 and 3, the longitudinal axis $A_X$ of the vehicle 14 and the longitudinal axes of $A_A$ of the shutter apertures 34 are substantially parallel to each other. In the partially open position of FIGS. 6 and 7, the longitudinal axes $A_Y$ of the shutter apertures 34 are still oriented along the longitudinal axis $A_X$ of the vehicle 14, but are not parallel to the longitudinal axis $A_X$.

The example shutter 30 of FIG. 8 includes six separate and distinct shutter apertures 34. Each of the shutter apertures 34 in the example shutter 30 of FIG. 8 is vertically misaligned relative to the other shutter apertures 34. Other examples shutters 30 include other numbers of shutter apertures 34, such as more than six shutter apertures, or less than six shutter apertures. The shutter apertures 34 of the exemplary embodiment are completely vertically misaligned and stacked atop on another to provide a columnar type shutter.

In this example, the shutters 30 additionally include extensions 70 that projecting forward from the inlets 62 of the shutters 30. The extensions 70 is on an outboard side of the shutters 30. In this example, the extensions 70 act as scoops that direct flow into inlets 62 of the shutter apertures 34, which can increase flow F through the shutter apertures 34 relative to shutters 30 lacking such extensions 70.

In some examples, the actuator assembly 38 can position the shutters 30 in a particular position to direct flow to a certain area of the engine compartment 26. For example, the partially open position of FIGS. 6 and 7 shows the actuator assembly 38 having adjusted the shutters 30 to a position where the shutter apertures 34 direct flow toward a median of the vehicle 14. This positioning can be contrasted with the shutters 30 shown in fully open position of FIGS. 2 and 3 where the shutter apertures 34 directly pass flow to the engine compartment 26 without any cross-car redirection.

Figure 9:
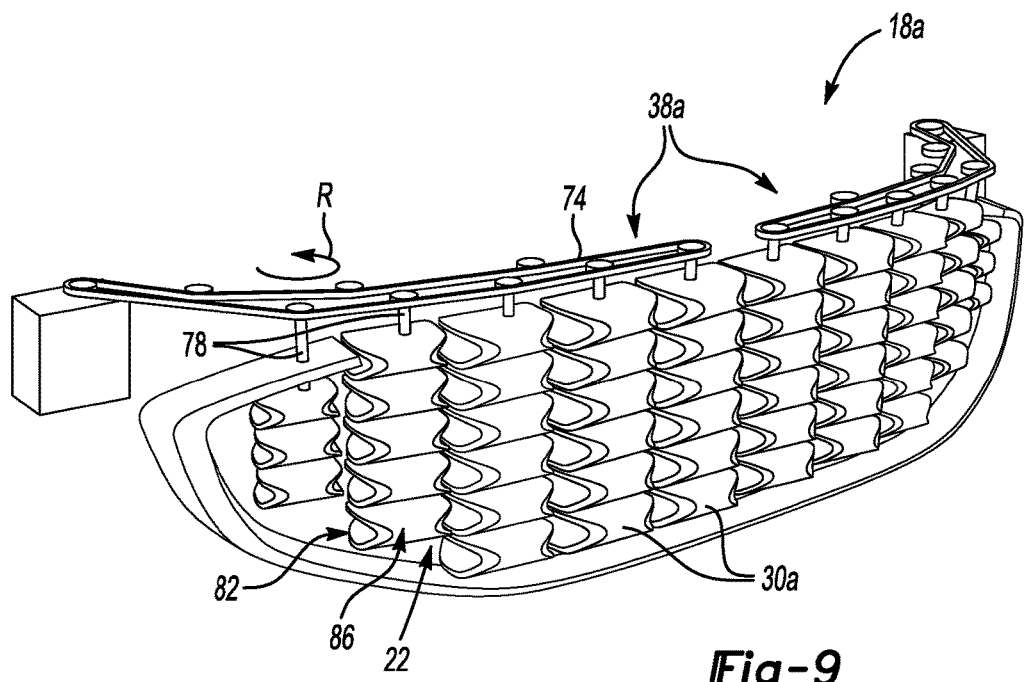
FIG. 9 illustrates a perspective view of a flow control assembly according to another exemplary embodiment that has a plurality of shutters in a fully closed position.
Figure 10:
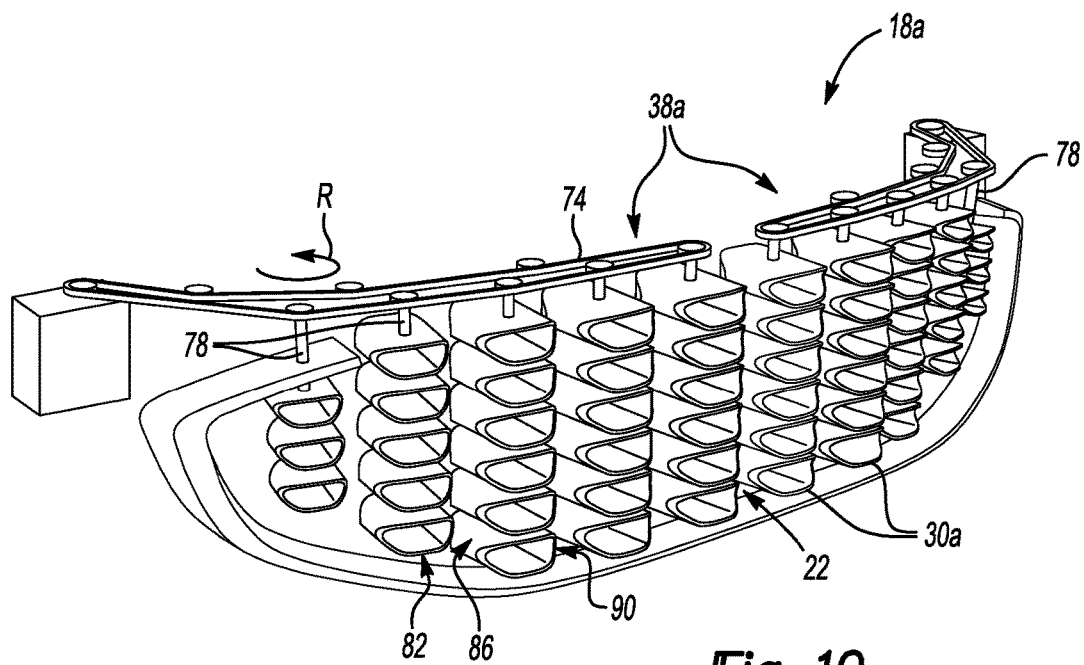
FIG. 10 illustrates a perspective view of the flow control assembly of FIG. 9 with the plurality of shutters in a fully open position.

Referring now to FIGS. 9 and 10 with reference to FIG. 1, another example flow control assembly 18a, includes a plurality of shutters 30a that are rotated by an actuator assembly 38*a* to control flow through the opening 22 of the vehicle 14. In this example, the actuator assembly 38*a* includes two cables or toothed belts 74 that move to rotate capstan shafts 78 extending from respective ones of the shutters 30*a*. Rotating the capstan shafts 78 rotates the shutters 30*a*.

The shutters 30*a* of the flow control assembly 18*a* can rotate more than 90 degrees. In this example, the shutters 30*a* can rotate 360 degrees in a direction R, for example. This amount of rotation can provide aesthetic options and flow control options beyond shutters that are rotatable less than 360 degrees.

For example, a first side 82 of the shutters 30*a* could be colored differently than a second side 86 of the shutters 30*a*. The actuator assembly 38*a* can rotate the shutters 30*a* to change the side of the shutters 30*a* visible from outside the vehicle 14. Additional areas of the shutters 30*a*, such as a third side 90, could be colored with other colors to provide even more coloring options.

Since the actuator assembly 38*a* includes separate actuators controlling the shutters 30*a* on the passenger side and the driver side. The shutters 30*a* could be, for example, in the closed position of FIG. 9, while the shutters 30*a* on the passenger side have a visible coloring different than the visible coloring of the shutters 30*a* on the driver side.

In another example, the actuator assembly 38*a* could include a first actuator and a second actuator that control alternating shutters moving laterally across the grille. In such an example, the flow control assembly could position adjacent shutters to have different visible colorings. The shutters could alternate as blue and white, for example, when viewed from the front 10 of the vehicle 14.

The passenger side actuator 38*a* could include one or more individual actuators at the outboard sides of the flow control assembly 18*a*, a median of the flow control assembly 18*a*, or both.

Figure 11C:
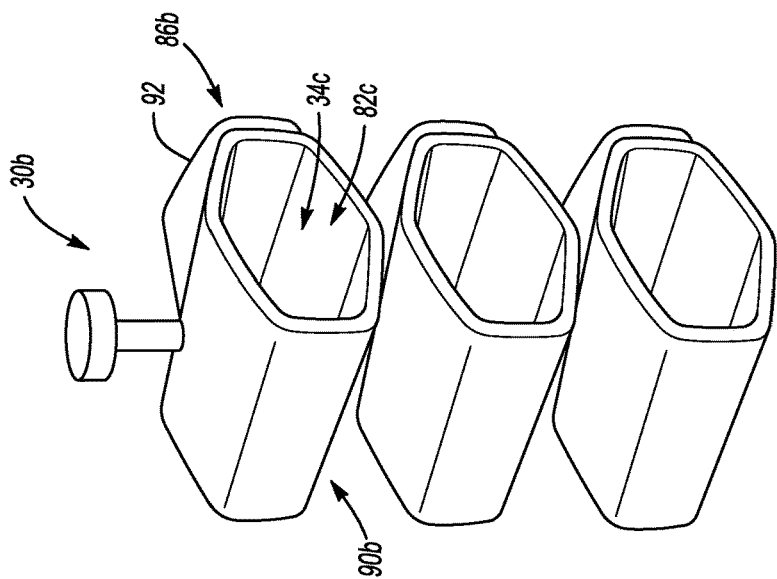
FIG. 11C illustrates yet another perspective view of the shutter of FIG. 11A.
Figure 11B:
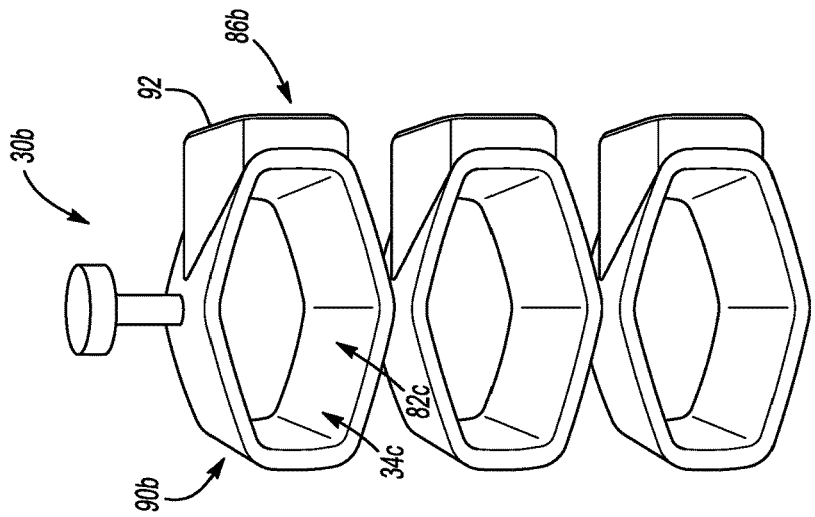
FIG. 11B illustrates another perspective view of the shutter of FIG. 11A.
Figure 11A:
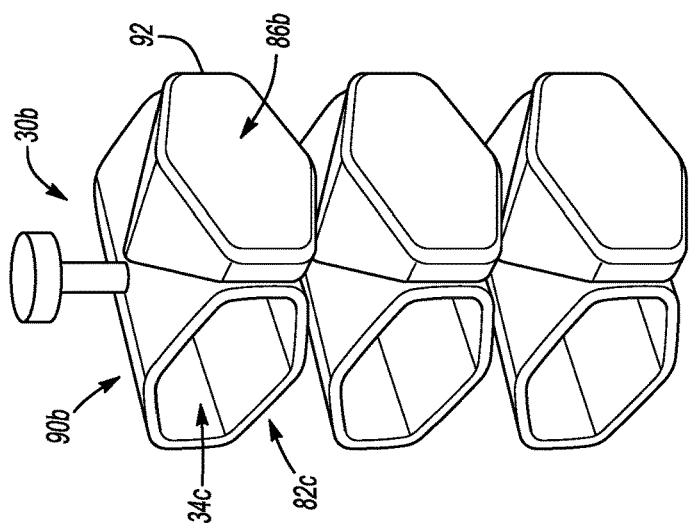
FIG. 11A illustrates a perspective view of a shutter from a flow control assembly according to yet another exemplary embodiment.

Referring now to FIGS. 11A to 11C with reference to FIG. 1, another example shutter 30*b* could be used with the flow control assembly 18*a* of FIGS. 9 and 10, which can rotate the shutter 30*b* more than 90 degrees.

The shutter 30*b* includes a side 82*b* with inlets to shutter apertures 34*b*, and a side 86*b* with raised features 92. Another side 90*b* of the shutter 30*b*, opposite the side 86*b*, lacks such raised features.

In this example, the raised features 92 are extensions having a hexagonal profile. In another example, the raised features 92 are instead recessed features, or another type of design feature.

Moving a plurality of the shutters 30*b* to a position where the sides 82*b* are visible provides a visible array of the inlets to the shutter apertures 34*b* distributed across the opening 22. Moving a plurality of the shutters 30*b* to a position where the sides 86*b* are visible provides a visible array of the raised features 92 distributed across the opening 22. Moving the shutter 30*b* to a position where the sides 90*b* are visible provides a relatively smooth covering over the opening 22.

Incorporating a plurality of the shutters 30*b* within the flow control assembly 18*a* can thus provide greater design flexibility and aesthetic options beyond coloring changes.

Figure 12C:
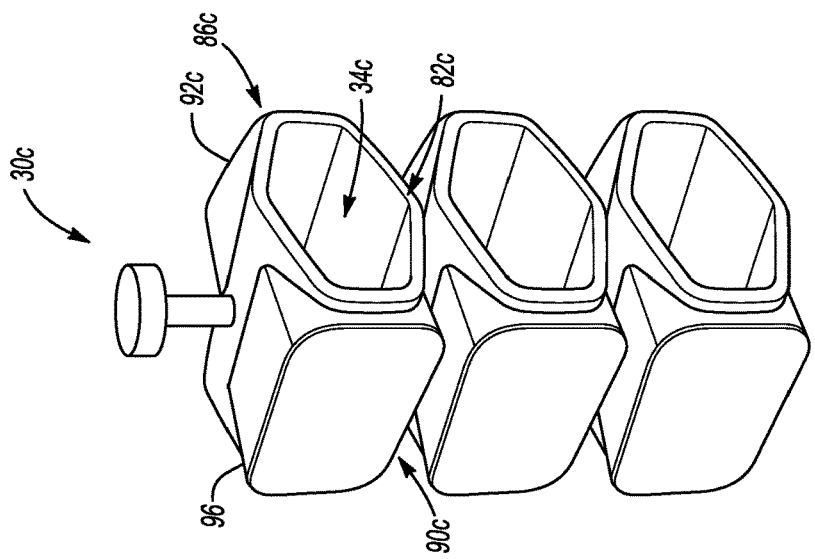
FIG. 12C illustrates yet another perspective view of the shutter of FIG. 12A.
Figure 12B:
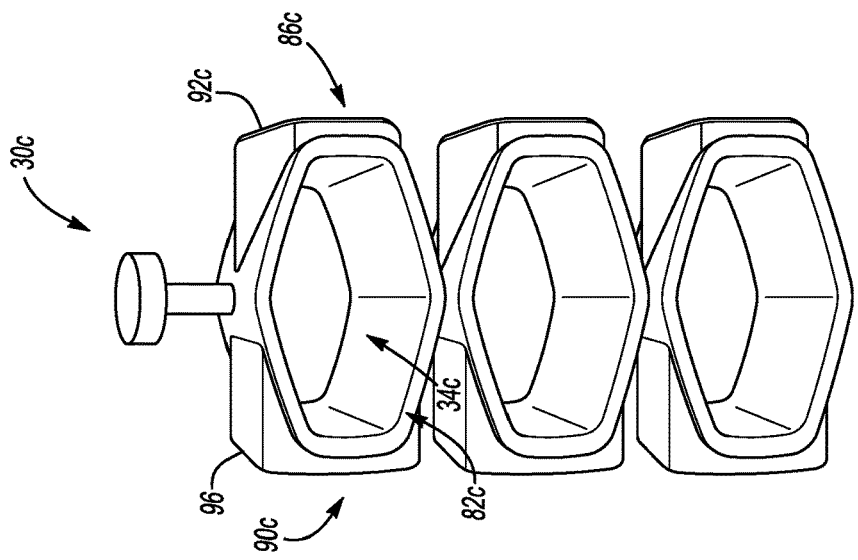
FIG. 12B illustrates another perspective view of the shutter of FIG. 12A.
Figure 12A:
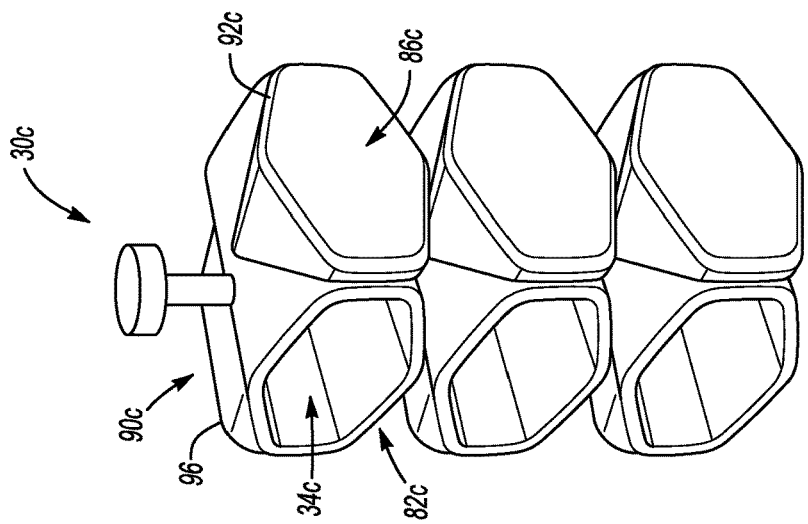
FIG. 12A illustrates a perspective view of a shutter from a flow control assembly according to yet another exemplary embodiment.

Referring now to FIGS. 12A to 12C with reference to FIG. 1, another example shutter 30*c* could be used with the flow control assembly 18*a* of FIGS. 9 and 10, which can rotate the shutter 30*c* more than 90 degrees.

The shutter 30*c* includes a side 82*c* with inlets to shutter apertures 34*c*, and a side 86*c* with raised features 92*c*. Another side 90*c* of the shutter 30*c*, opposite the side 86*c*, includes another type of raised features 96.

In this example, the raised features 92*c* are an extension having a hexagonal profile, and the raised feature 96 is an extension having a rectangular profile. In another example, one or both of the raised features 92*c* and 96 are instead a recessed feature, or another type of design feature.

Moving a plurality of the shutters 30*c* to a position where the sides 82*c* are visible provides a visible array of the inlets to the shutter apertures 34*c* distributed across the opening 22. Moving a plurality of the shutters 30*c* to a position where the sides 86*c* are visible provides a visible array of the raised features 92*c* distributed across the opening 22. Moving the shutter 30*c* to a position where the sides 90*c* are visible provides a visible array of the raised features 96 distributed across the opening 22.

Incorporating a plurality of the shutters 30*c* within the flow control assembly 18*a* can thus provide greater design flexibility and aesthetic options beyond coloring changes.

Figure 13:
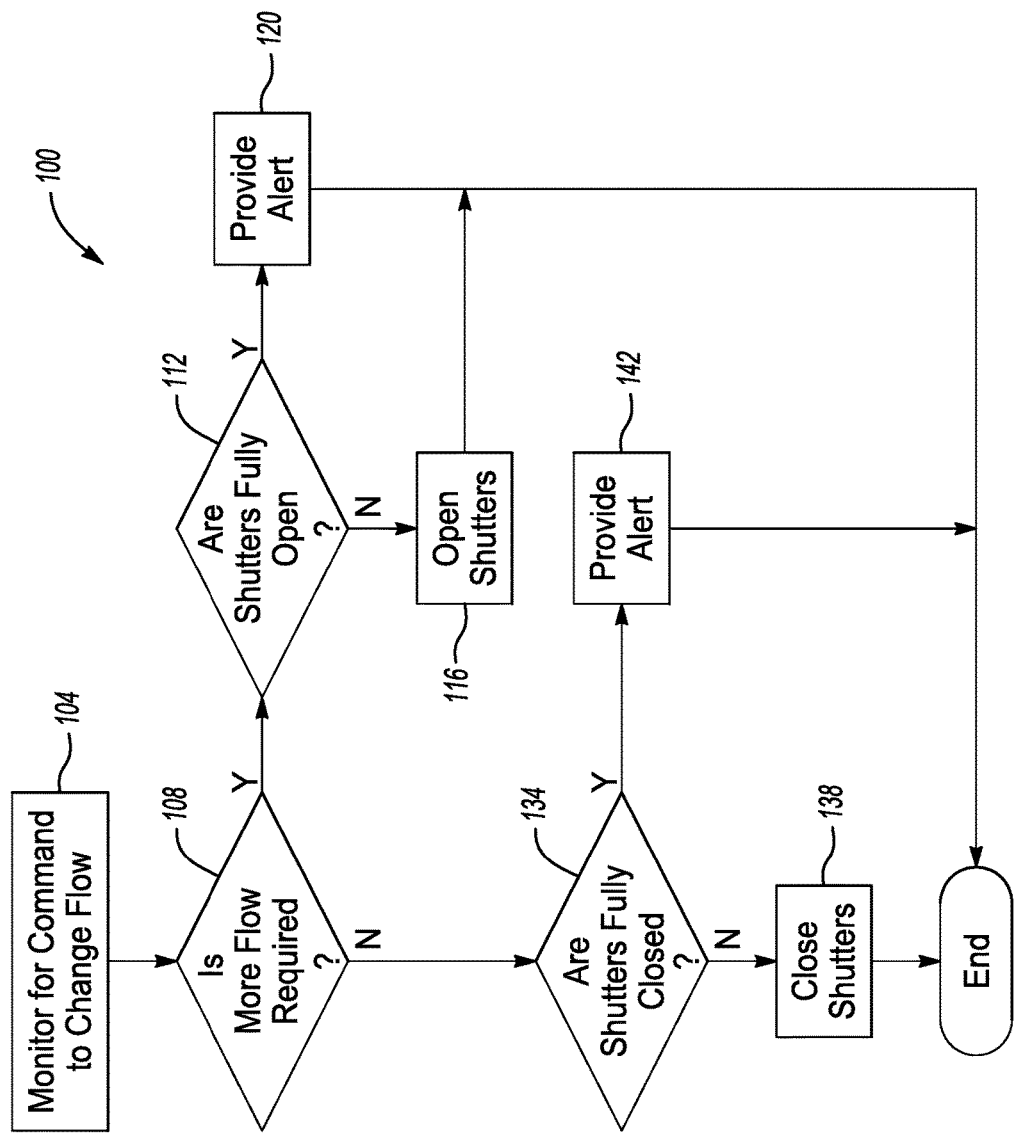
FIG. 13 illustrates the steps in an example flow control method that utilizes shutters having apertures.

Referring now to FIG. 13, an exemplary flow control method 100 begins at a step 104 where the method 100 monitors for a command to change flow through an opening to an engine compartment. The step 108 then calculates if the command is a request for more flow. If yes, the method 100 moves to a step 112, which calculates whether the shutters are fully open. If, at the step 112, the shutters are not fully open, the method 100 moves to a step 116 where an actuator is commanded to open the shutters to increase the flow. If, at the step 112, the shutters are fully open, the method 100 provides an alert at a step 120. The alert could be a visual alert, and audio alert, or some combination of these. The alert notifies a user that the shutters are fully open.

If the step 108 calculates that the command is not a request for more flow, the request is interpreted as a request for less flow. The method 100 then moves from the step 108 to the step 134, which calculates whether the shutters are fully closed. If, at the step 134, the shutters are not fully closed, the method 100 moves to a step 138 where an actuator is commanded to close the shutters to decrease the flow. If, at the step 134, the shutters are fully closed, the method 100 provides an alert at a step 120. The alert could be a visual alert, and audio alert, or some combination of these. The alert notifies a user that the shutters are fully closed.

The method 100 after the steps 116, 120, 138 and 142. The method 100 may return to the step 104 of monitoring after ending.

The method 100 could instead, or additionally, be used to change the aesthetics of the opening to the engine compartment. For example, the step 104 could instead monitor for a command to change the aesthetics of the grille by switching from, for example, an visible array of inlets to apertures in shutters to a visible array of another design feature, such as a visible array of a visible array of the raised features 92 (FIGS. 11A to 11C) distributed across the opening to the engine compartment of the vehicle.

Features of the disclosed examples include a flow control assembly with moveable shutters having shutter apertures. The flow control assembly can alter flow through an opening, such as an opening to an engine compartment of a vehicle. In particular, changes to the position of the shutters can be made to change an amount of flow through shutter apertures of the shutters, which alters flow through the opening. Closing the opening, such as an engine compartment opening, may be desirable to meet marketing and design appearance wants. However, the opening is desired to still sometimes permit flow to meet, for example, cooling and climate control attributes.

The position of the shutters can be changed to instead, or additionally, alter the aesthetics of the opening. Some or all of the shutters could, for example, move to a position to provide a particular appearance to the opening. Some or all of the shutters could be moved to a position where a design feature, such as a raised feature, is visible as an array distributed across the opening. The shutters could be painted or include various design features to aesthetically distinguish the shutters in the various positions.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A flow control assembly, comprising:
   a plurality of shutters each having at least one aperture, the plurality of shutters configured to move back and forth between a first position and a second position to influence a flow through the at least one aperture,
   the plurality of shutters in the first position permitting more flow through the apertures than the plurality of shutters in the second position, the plurality of shutters each spaced a distance from the directly adjacent shutters when the plurality of shutters are in the first position to provide a gap between the directly adjacent shutters when the plurality of shutters are in the first position.

2. The flow control assembly of claim 1, wherein each of the apertures has an outer perimeter that is provided entirely by one of the plurality of shutters.

3. The flow control assembly of claim 1, wherein the plurality of shutters in the second position block flow through the at least one aperture.

4. The flow control assembly of claim 1, wherein the plurality of shutters in the first position permit flow through the at least one aperture from a position outside a vehicle to a position within a compartment of the vehicle.

5. The flow control assembly of claim 4, wherein the compartment is an engine compartment.

6. The flow control assembly of claim 4, wherein areas of the plurality of shutters that are visible from outside the vehicle when the plurality of shutters are in the first position have a first color, and areas of the plurality of shutters that are visible from outside the vehicle when the plurality of shutters are in the second position have a different, second color.

7. The flow control assembly of claim 1, wherein the at least one aperture comprises a first aperture and a second aperture that is vertically next to the first aperture, the second aperture spaced a distance from the first aperture to provide an open area that is vertically between the first and second apertures and is outside of any aperture of the flow control assembly.

8. The flow control assembly of claim 1, further comprising a structure of a vehicle, the plurality of shutters configured to move back and forth between the first position and the second position to alter flow through an opening within the structure, wherein the plurality of shutters in the second position block flow through the apertures to block flow through the opening.

9. The flow control assembly of claim 1, wherein the first position is a fully open position and the second position is a fully closed position.

10. The flow control assembly of claim 1, wherein the plurality of shutters are rotatable back and forth from the first to the second position about an axis of rotation, and the plurality of shutters are rotatable more than 90 degrees about the axis.

11. The flow control assembly of claim 10, wherein the plurality of shutters are rotatable 360 degrees about the axis.

12. A flow control assembly, comprising:
    a plurality of shutters each having at least one aperture, the plurality of shutters configured to move back and forth between a first position and a second position to influence a flow through the at least one aperture,
    wherein the plurality of shutters in the first position permit flow through the at least one aperture from a position outside a vehicle to a position within a compartment of the vehicle,
    wherein each aperture extends along a respective aperture axis, wherein the aperture axes are more aligned with a longitudinal axis of the vehicle when the plurality of shutters are in the first position than when the plurality of shutters are in the second position,
    wherein the aperture axes are aligned with the longitudinal axis of the vehicle when the plurality of shutters are in the first position, and the aperture axes are aligned with a cross-car axis of the vehicle when the plurality of shutters are in the second position.

13. A flow control method, comprising:
    moving a plurality of shutters back and forth between a first position and a second position, the first position permitting more flow through at least one aperture within each of the plurality of shutters than the second position, the plurality of shutters in the first position spaced a distance from each other such that flow can move through a gap between adjacent shutters within the plurality of shutters.

14. The flow control method of claim 13, wherein an entire circumferential perimeter of each of the apertures is provided by one of the plurality of shutters.

15. The flow control method of claim 13, further comprising communicating the flow directly from the at least one aperture to a compartment of a vehicle.

16. The flow control method of claim 13, further comprising moving the plurality of shutters to control flow through an opening of a structure of a vehicle, the plurality of shutters in the second position blocking flow through the apertures to block flow through the opening.

17. The flow control method of claim 13, wherein the moving comprises rotating the shutters more than 90 degrees.

18. The flow control method of claim 17, wherein each aperture extends along a respective aperture axis, wherein the aperture axes are rotated away from a position aligned with a longitudinal axis of a vehicle when the plurality of shutters are rotated from the first position to the second position.

19. The flow control method of claim 13, wherein first position is a fully open position and the second position is a fully closed position.

20. The flow control method of claim 13, wherein the plurality of shutters control flow to a compartment of a vehicle, wherein areas of the plurality of shutters that are visible from outside the vehicle when the plurality of shutters are in the first position have a first color, and areas of the plurality of shutters that are visible from outside the vehicle when the plurality of shutters are in the second position have a different, second color.

* * * * *